Dec. 20, 1932. V. P. WILLIAMS 1,891,858
UNIVERSAL JOINT WITH SHROUD
Filed Nov. 19, 1930   2 Sheets-Sheet 1
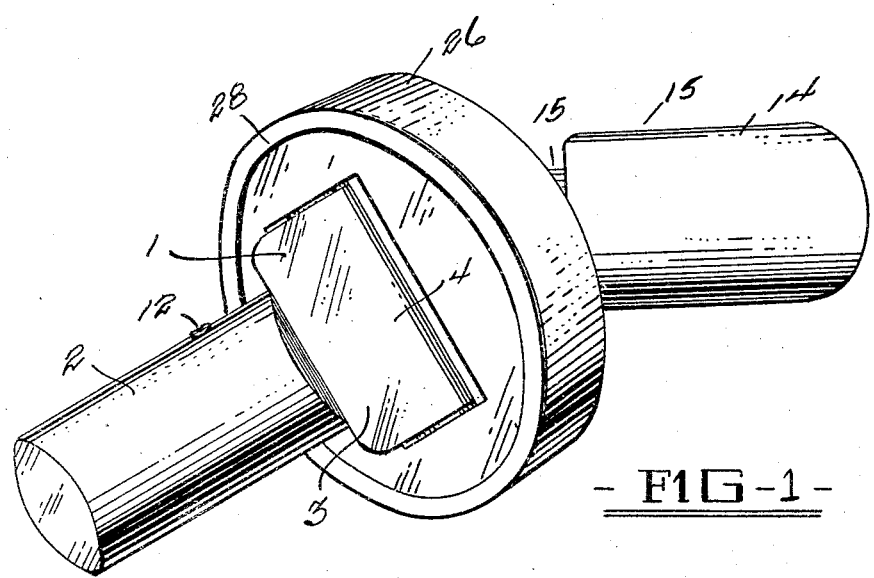
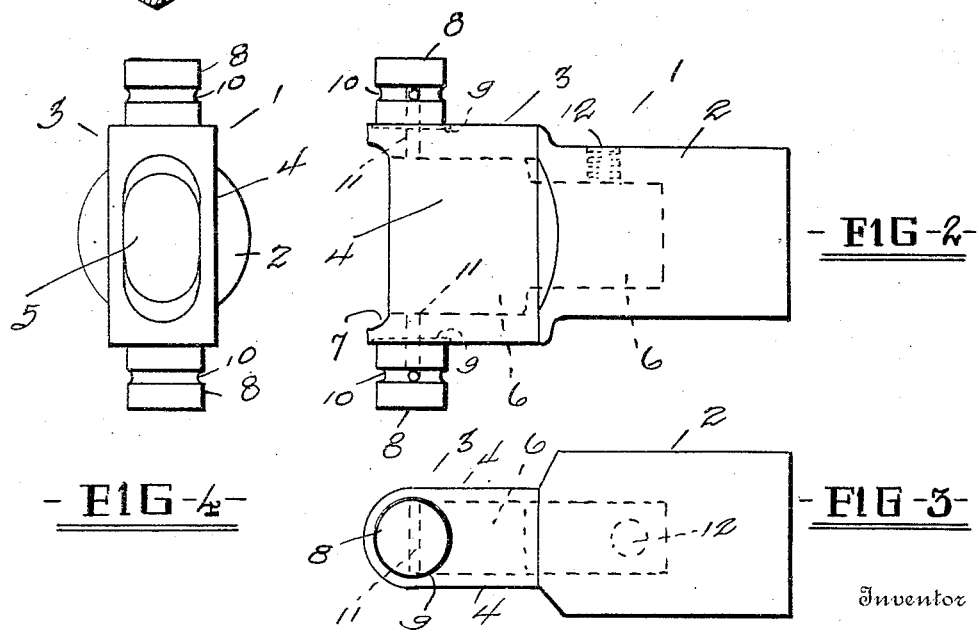
Inventor
VILLOR P. WILLIAMS.
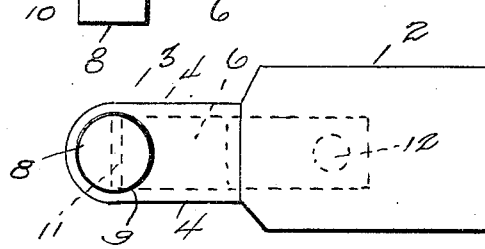
Attorney

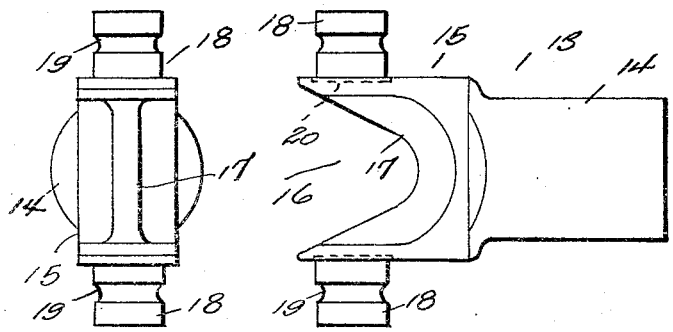
FIG-7- FIG-5-
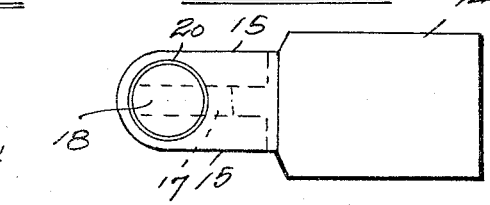
FIG-6-
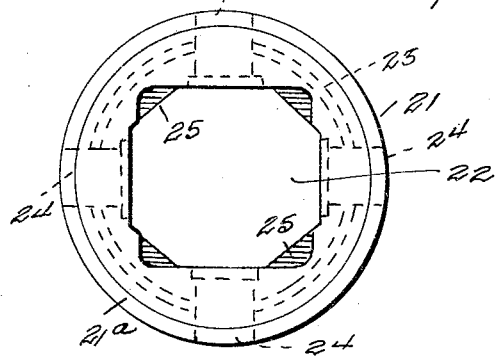
FIG-8-
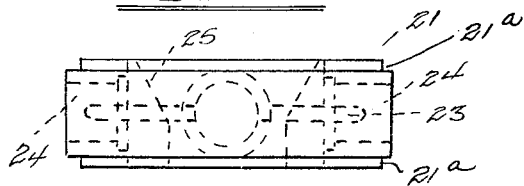
FIG-9- FIG-10-
Inventor
VILLOR P. WILLIAMS
By
Attorney Patented Dec. 20, 1932

1,891,858

UNITED STATES PATENT OFFICE

VILLOR P. WILLIAMS, OF BALTIMORE, MARYLAND, ASSIGNOR, BY MESNE ASSIGNMENTS, TO ESTELLE P. WILLIAMS, OF BALTIMORE, MARYLAND

UNIVERSAL JOINT WITH SHROUD

Application filed November 19, 1930. Serial No. 496,756.

My present invention, in its broad aspect has reference to improvements over the type of universal joints defined in my copending applications Serial #441,146 and 441,145, filed April 2nd, 1930, and in part covers divisional subject matter. In my present embodiment of a universal joint I provide a system of lubrication for the joint which is similar to that described in my copending application #441,145, and wherein a sealed cavity is provided in an integral part of the joint knuckle serving as a reservoir for lubricant, and from which lead channels through the joint pins to a continuous channel in the joint ring so that the flow of oil or other lubricant is continuous to all of the pins, and is effected solely by centrifugal force. My present joint differs from the joint described in my copending application #441,146 in that there are absolutely no screws, bolts, and small fastening parts used in its construction; there being a flanged, annular shroud, sleeve or ring about the two sections of the pin ring which serves in two capacities (1) to prevent leakage of lubricant from the ring and pins, and (2) to hold the sections of the ring together in assembly to retain the pins and other elements of the joint in an operative set-up relationship. My present joint also differs from that described in my copending applications Serial #441,145 and 441,146 in that the oil distributing channel in the ring is not interrupted by screws, bolts or the like; the ring sections are much simpler and much stronger, since the amount of metal is increased due to elimination of bolt holes. The configuration of the cut out center of the ring sections is such that the greatest strength is provided and reinforcement provided at the proper places; the center of the ring having a substantially square configuration, with the corners reinforced by a web; the outer surface of the ring-sections is smooth and plane; and the sections are dust and oil tight and have no parts which are liable to accumulate grease or the like. The knuckle and pin sections are simpler than those described in my copending application #441,146, and stronger; the pins being so placed and reinforced that they cannot break off or crack, and the lubricating reservoir sealed by a plate in the simplest manner; the shroud or sleeve serves both to prevent seepage of oil, to render the joint dust proof; and to strengthen the joint, and hold the sections of the ring together without the use of bolts, screws or the like; also to increase the ease with which the joint may be assembled, since the assembling operation contemplates merely flanging over the shroud on one side of the ring to hold the ring sections together. My present joint also attains a greater flexibility without sacrificing strength, in that an angle in excess of 40° is attained in a relatively small joint.

Accordingly it may be briefly stated that the principal advantages of my present invention include first; the utilization of a one piece, annular, flanged shroud, which eliminates the use of any bolts, screws or the like in assembling the ring, and second prevents entrance of dust to the ring sections, prevents escapement or seepage of oil, and increases the strength of the joint; third the knuckles and pins are reinforced at the parts where the greatest stress takes place so that cracking of the pins and the like is prevented; and the principal of hollow shafting is utilized to increase rigidity, the walls of the lubricating reservoir being spaced and relatively parallel to take up opposed stresses beneath the pins; fourth, the working parts of the joint, including all four pins, are lubricated continuously and simultaneously while the joint is in operation through the medium of centrifugal force which induces a continuous flow of oil from and back to the sealed reservoir in an integral part of one knuckle; fifth, the joint has a flexibility in excess of 40° without sacrificing strength, or increasing its size, and all of the parts are self lubricating, and sixth the number of parts are reduced to a minimum, so that there are but four parts; the two knuckles with the pins formed integral therewith, the ring, and the shroud.

Manifestly some of the parts of the joint may be modified as to size and shape to meet certain requirements of practice, and various details of construction may also be slightly changed; therefore it is pointed out that the right to make such changes is reserved provided they fall within the scope of what is claimed.

In the drawings wherein my universal joint is illustrated;—

Figure 1 is a perspective view of my universal joint;

Figure 2 is a side view of the male knuckle element;

Figure 3 is a top view of the male knuckle element;

Figure 4 is an end view of the male knuckle element;

Figure 5 is a side view of the female knuckle element;

Figure 6 is a top view of the female knuckle element;

Figure 7 is an end view of the female knuckle element;

Figure 8 is a face view of the joint ring, with the shroud removed;

Figure 9 is an edge view of the joint ring; and

Figure 10 is a view showing the details of the shroud.

In the drawings wherein like characters of reference are used to designate like or similar parts;—

My universal joint is formed with two knuckle elements; the male knuckle element (1) has a cylindrical shank (2), and a slightly flattened head (3); by slightly flattened is meant that the head part has two plane flat faces (4): the forward part of the shank, and the head are hollowed out to form in an integral part of the knuckle a cavity serving as a lubricant reservoir, and this cavity is sealed by a plate (5); the cavity itself is designated (6). The forward part or edge of the head is set in as at (7), and oppositely opposed on each edge, top and bottom, of the head (3) are the joint pins (8); same being formed integral with the head. About the bases of the pins and in the head is an annular recess for receiving packing; the recess being designated (9); each pin has an annular groove (10) located midway its base and end, and is internally drilled or bored as at (11) to the lubricant reservoir or cavity (6) so that lubricant is fed constantly and continuously to the groove (10) of each pin (8) by centrifugal force when the joint is in operation after the manner described in my copending application Serial #441,145. There is a suitable screw-plug (12) for filling the cavity with lubricant.

The female knuckle element (13) also has a cylindrical shank (14) and a flattened head (15); but the head is cut away as at (16) to form a Y-recess or bifurcation, which is reinforced by a web (17); this knuckle element is not cavitated after the manner of the male knuckle element. The two opposed joint pins (18) are integral with the knuckle head, and each is channeled as at (19) similar to pins (8), and there is provided an annular groove or recess (20), similar to recess (9) for receiving packing.

In practice the male and female knuckles are fitted together so that the four pins 8—8 and 18—18 are diametrically opposed at points contemplated by the four quarter points of a circle; that is the male knuckle element is fitted with its head receivable in the Y-recess or bifurcation (16) of the female element.

There is provided a two-part ring for holding the knuckle elements together. Each part of the ring (21) is annular in peripheral conformation, and has a relatively quadrangular or square center opening (22); each ring element has an annular oil distributing groove (23) in its inner face, and four semi-cylindrical recesses (24) to receive the pins 8—8 and 18—18 so that the grooves 10 and 19 of the pins register with the oil distributing groove (23). The ring sections are faced together with the semi-cylindrical recesses (24) and grooves (23) registering to confine the pins, after the manner shown in my copending application Serial #441,146.

The edges of the ring sections are beveled out at the two opposed points of the square center opening where the hinging action of the knuckles takes place, that is; in the direction of the hinge action, thereby permitting a flexibility in excess of 40°; the beveling leaving a reinforcing web (25). However it will be noted that the ring is not beveled or otherwise formed with its metal structure reduced at the points where the recesses (24) are located to receive the pins, so that the ring assembly is exceptionally strong.

The outside annular peripheral edge of each ring section (21) is formed with an annular groove (21a); and there is provided a circular shroud, or sleeve or ring-like member (26) which is so formed that it has a slip fit over the rings when they are assembled together. Before assembling the shroud (22) on the rings it has but one flange (27): the rings are assembled together about the pins 8—8 and 18—18 to hold the knuckles together and form the assembly; the shroud is then positioned about the assembled ring sections with the flange (27) fitting in one of the grooves, at which time the remaining edge of the shroud (26) is flanged down as at (28) into the other ring groove to not only hold the ring sections, pins and knuckles of the universal joint in assembly, but to form a leak proof covering about the ring elements and ends of the pins; the same being also dust proof. It will be noted that in assembling my universal joint no screws, bolts or the like are used; the shroud (26) functioning to complete the assembly, so that the universal joint as completed and ready for operation has but four parts; the knuckle elements (1) and (13); the ring (21) and the shroud (26).

It is believed that the operation, and advantages of my joint will be apparent from the foregoing; but attention is again called to its high degree of flexibility (in excess of 40°); its simplicity; its strength; the fact that it is relatively self-lubricating; the ease with which it may be assembled; and the unusual and unique formation of its several parts. However, since certain minor changes in structure may be indicated from time to time to conform to practical requirements for different classes of work, and different loads, the scope of the invention should only be determined from the claims appended hereunto.

I claim:—

1. In a universal joint of the type having knuckles and pins on the knuckles, and a ring formed in two similar sections to engage and hold the pins in assembly; the sections of said rings having each a squared opening in the outer face through which the knuckles extend, and web parts inwardly beveled toward the center of the joint, said web parts located at the corners of the respective openings of the ring sections to provide reinforcements at said corners and at the same time to permit a wide flexibility.

2. In a universal joint of the type having a bifurcated knuckle and a T-knuckle and pins on said knuckles, and a ring formed in two similar sections to engage and hold the pins in assembly; the sections of said ring each having a squared opening in the outer face through which the knuckles extend, and web parts inwardly beveled toward the center of the joint, said web parts located at all of the four corners of the respective openings of the ring sections to provide a reinforcement therefor while at the same time permitting a flexibility in excess of 40°; the bifurcation of the bifurcated knuckle being substantially deeper at the lateral edges than in the center whereby to provide a reinforcing web which extends to a point beneath the pins.

In testimony whereof, I affix my signature hereunto.

VILLOR P. WILLIAMS.